CIRCUIT ARRANGEMENT FOR CALLING-SUBSCRIBER IDENTIFICATION IN AUTOMATIC TELEX-EXCHANGES
Filed Aug. 13, 1962
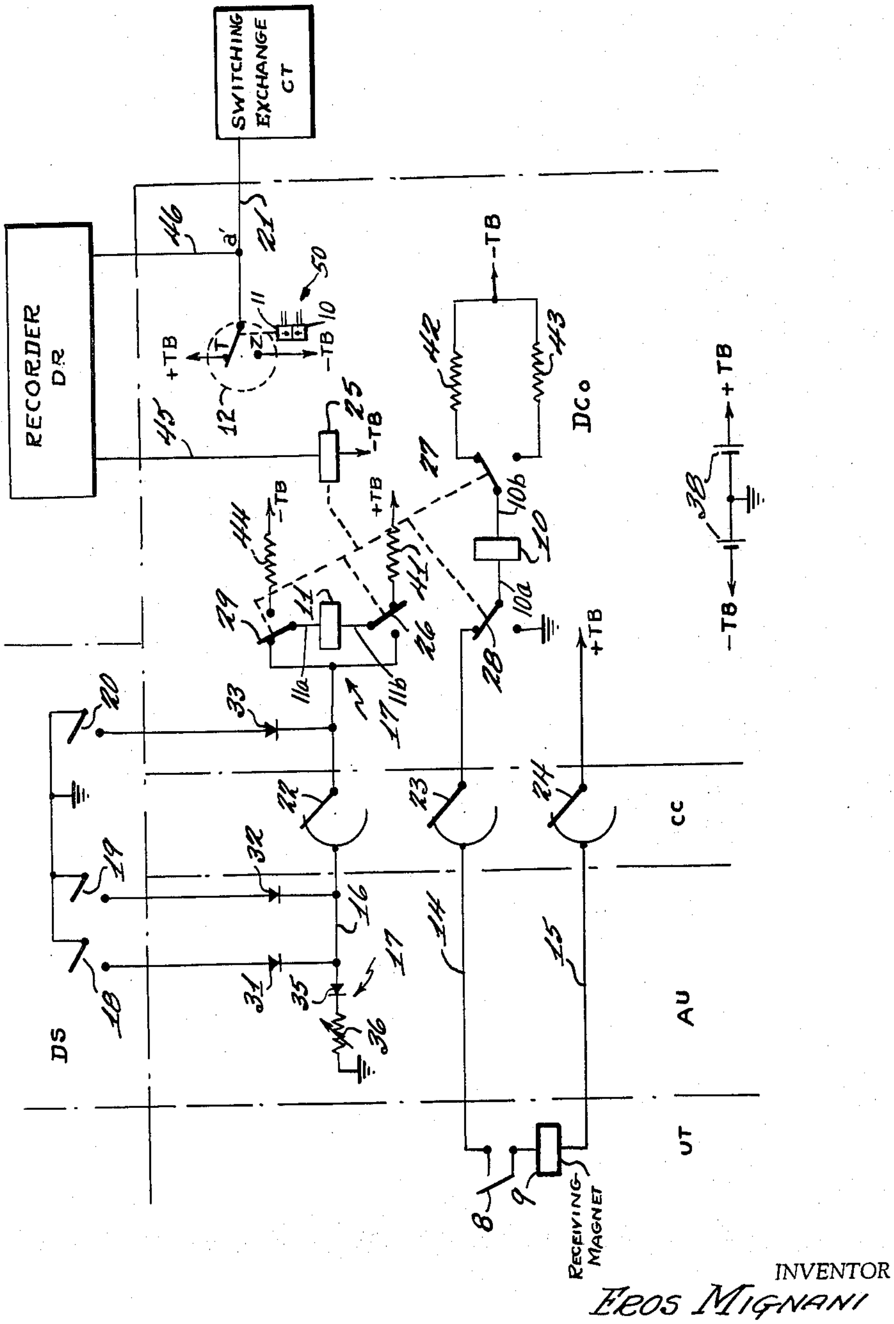
INVENTOR
EROS MIGNANI
BY Irwin S. Thompson
ATTORNEY United States Patent Office 3,243,506
Patented Mar. 29, 1966

3,243,506
CIRCUIT ARRANGEMENT FOR CALLING-SUBSCRIBER IDENTIFICATION IN AUTOMATIC TELEX-EXCHANGES

Eros Mignani, Milan, Italy, assignor to Società Italiana Telecomunicazioni Siemens S.p.A., Milan, Italy, a corporation of Italy Filed Aug. 13, 1962, Ser. No. 216,573
Claims priority, application Italy, Sept. 21, 1961, 17,010/61
2 Claims. (Cl. 178—2)

In wholly automatic, Telex-connection systems, that is, those in which connections are established without intervention of any intermediate manual operation, it becomes necessary, for charge counting, to automatically record information suitable to identify the subscriber who has established the connection. This information may be e.g., the number of the calling-subscriber itself.

An object of the invention is to provide an arrangement of circuits for the automatic sending of telegraph signals suitable for calling-subscriber identification, in automatic Telex-exchanges.

An arrangement of circuits for automatic Telex-exchanges is already known, in which the number of the subscriber who has established the connection is automatically conveyed, as a telegraph-signal train, to a recording device that has requested it, for the connection charge counting. This arrangement includes a centralized signal distributor having ten outputs, to which are applied, during a predetermined time interval, different signals which characterize the "units" digits of subscribers' telephone numbers included in the Telex-exchange. Another group of signals characterizing the "tens" digits are conveyed, during a time interval different from the preceding one, over ten other outputs of the distributor. There are provided, furthermore, additional groups of ten outputs employed eventually for hundreds, thousands, and so forth.

In the known arrangement, the blades of the contact-boards of the call-finders relative to a particular subscriber are connected, by wires known as identification wires, to those outputs of the centralized signal distributor to which are conveyed the signals corresponding to the digits of "units," "tens," "hundreds," etc., of the particular subscriber's number. A particular "units" output, furthermore, will be connected to the blades of contact-boards of the call-finders relative to all subscribers whose numbers have, as their "units" digit, a figure corresponding to that output. In this way, a particular "tens" output (or "hundreds") will be connected to the contact-board blades relative to subscribers whose "tens" digit (or "hundreds") corresponds to that output. There are, thus, many wires converging on one of the board blades and a multiple number of wires that leave from any output of the distributor towards several board blades. In order to avoid returning currents, wires converging on a blade are decoupled by rectifiers.

When during a Telex-connection, the identification of the calling subscribers is wanted, a device termed the connection-control, associated with the call-finder connected to the calling subscriber, prepares an identification circuit. In this circuit, the following elements are disposed in series: a first winding of a telegraph-relay, an arm of the call-finder connected to the board blade relative to the calling subscriber, and the identification wires connected to suitable outputs from the centralized signal distributor. In this distributor the ouputs are connected, through switching means, to the positive pole of a separately provided battery, independent of the telegraphic main battery, while the negative pole of the former is connected to a return wire leading to the telegraph-relay winding. A second winding of the telegraph-relay is located in a holding-circuit which holds the relay in the stand-by position. During the identification, when the signal distributor by the closing of its own switching means conveys to the identification circuit pulses suitable to characterize the calling subscriber, the identification circuit excitation prevails on the holding-circuit excitation in such a manner that the telegraph-relay is actuated by the received pulses and forwards corresponding pulses to a device which records the subscriber's number.

In the already known arrangement of circuits, the battery inserted in the identification circuit is, as has been said, independent of the telegraphic main battery. This feature causes some troubles which are hereinafter described.

In the known system, the telegraph-relay, besides forwarding the identification pulses, has to convey ahead, during a connection, the pulses sent over the wire-pair by the calling subscriber. In this case, the function of the two relay windings is inverted with respect to that they had during identification. The second winding must now receive the pulses and is thus connected on the subscriber's wires. At the same time the first winding, disposed in a holding-circuit, is connected at one end to the positive pole of the telegraphic main battery and at the other to the negative pole through an arm of the call-finder, the board blade relative to the calling subscriber and a variable resistor disposed at the subscriber's terminals. The variable resistor serves as a compensating resistor.

For economic reasons, the board blade to which the compensating resistor is connected is the same blade to which the identification wires and relative decoupling rectifiers are also connected. An accidental grounding, then, may cause the burn-out of decoupling rectifiers disposed on identification wires connected to compensating resistors set at very low ohmic values.

Because the simultaneous identification of several subscribers may be requested, in the known arrangement of circuits the voltage of the independent battery connected in the identification circuit must be near 60 volts, so that the identification circuits that operate contemporaneously will not be disturbed by an excessive voltage drop at the common decoupling rectifiers.

During identification-pulse sending, because of the closing of the switching means of the signal distributor, the positive pole of the independent battery becomes connected through identification wires and compensating resistor, to the negative pole of the telegraphic battery, referred to ground. Thus the negative pole of the independent battery gains a potential given by the sum of potentials of the two batteries, that is −120 referred to ground. That potential value is not permitted by safety regulations for such installations.

According to a known construction, the identification pulses conveyed to the distributor outputs are of the 5-element telegraph code type. The signal distributor receives, from a centralized signal emitter, the 5 code elements as ground pulses through 5 different wires; it amplifies and processes them; and it provides the transmission, by electronic switching means, of suitable combinations of the code elements as pulses of a potential independent of telegraphic battery ground. These pulses are transmitted first to "hundreds" outputs, then to "tens" outputs, and finally to "units" outputs. In the signal distributor, therefore, for the transformation of signals from ground pulses to pulses of a potential independent from telegraphic battery ground, bistable multivibrators and related amplifiers are needed.

An object of the present invention is to overcome these difficulties by using also in the identification circuit the telegraphic battery as a power source for identification pulses.

The invention relates to an arrangement of circuits for calling-subscriber identification in switching Telex-exchanges, in which the signal distributor outputs suitable to characterize the calling-subscriber are connected in series to a relay, which is provided for telegraph-signal transmission, through an arm of the call-finder connected to the calling-subscriber and switching means driven by a recording device. The invention is characterized by the fact that the telegraphic battery itself serves as the energy source for the pulses conveyed to the signal distributor outputs.

The invention relates to switching Telex-exchanges in which, on blades of the contact-board of the call-finders, relative to a subscriber, are connected together the identification wires coming from outputs of the signal distributor and a compensating resistor of the subscriber's wire pair, and is characterized by the fact that the potential with which the identification pulses are sent by the distributor is the same potential to which the compensating resistor is connected, being this last potential blocked by a rectifier, during subscriber identification.

With the arrangement of circuits according to the invention, besides the economic and bulk advantages which are derived from using a single energy source, any accidental grounding of signal distributor outputs cannot damage the rectifiers connected with the identification wires, because those wires are already connected to ground potential through the compensating resistor.

Furthermore, since the telegraphic battery itself is used in the identification circuit, there are not any wires at a potential greater than 60 volts with respect to ground.

A further economic advantage of the invention arises due to the fact that the signal distributor, receiving signals from the centralized signal emitter as ground pulses the same as in known circuit arrangements, in accordance with the invention retransmits signal combinations characterizing the calling-subscriber as ground pulses by means of simple repeater-amplifiers. As a result, bistable multivibrators are no longer needed.

Various other objects and advantages of the present invention will be apparent from the following description, the appended claims pointing out its novel features and arrangements, and the accompanying drawing, the single figure of which illustrates as a non-limiting example one parctical embodiment of the invention. All circuit elements unnecessary to an understanding of the invention have been omitted from the drawing figure.

In the single figure of drawing, a subscriber's device is shown at the left, schematically represented by the transmission contact 8 and the receiving magnet 9. During a connection, the subscriber's device 8, 9 is connected by way of its own subscriber's terminals AU and a call-finder CC to a connection-control circuit DC*o*. This control circuit DC*o* contains a telegraph relay comprising two windings 10 and 11, as well as a contact 12 having a rest position T and a signal-transmitting position Z. Elements 10 and 11 are windings of the same polarized relay, which operate contact 12. The wire leads of the winding 11 are connected to the contacts 26 and 29; the wire leads of the winding 10 are connected to the contacts 27 and 28. The contact 12 remains as shown or goes into the Z position when a magnetic field is generated by a current, in one of the two windings in a predetermined direction. Contact 12 remains or goes into the T position if current flows in the opposite direction through said windings. Therefore, since the winding 10 is crossed by a null current of an opposite direction, and the winding 11 is crossed by a null current of a predetermined direction, the contact 11 goes into the T or Z position, according to whether there prevails the magnetic field generated by the winding 10 or that generated by the winding 11. The winding 10 is inserted in the writing telegraph circuit formed by wires 14 and 15. The other winding 11 of the telegraph relay is located in a compensation circuit generally indicated by 17, which includes a wire 16, a rectifier 35 and an adjustable compensating resistor 36. The telegraph signals transmitted by the subscriber to the connection-control circuit DC*o*, through the subscriber's terminals AU and the call-finder CC, are forwarded from the telegraph relay over a wire 21 to selection means in the switching exchange CT.

In the upper left part of the drawing, there is schematically shown a centralized signal distributor DS, of a well known type. This distributor serves to convey to its outputs the groups of signals used for calling-subscriber identification. The signal distributor DS comprises a number of electronic circuits, represented in the drawing for simplicity by switches 18, 19 and 20, and depends upon the turning on of these electronic circuits to convey the aforesaid signal groups.

A conventional recording device DR is shown at the upper right corner of the figure. For the purpose of charge counting, recorder DR may request the caller's number; and, for this reason, it is connected through a wire 46 to the output wire 21 of the connection-control DC*o*. This connection to wire 21 allows recorder DR to receive the identification signals being forwarded by the telegraph relay. In addition, a relay 25 is connected between an output of recorder DR and the negative pole of a battery 38 so that, under conditions explained subsequently, the recorder may selectively excite relay 25. The relay 25 is provided with four contacts 26, 27, 28, 29, which assume the normal positions illustrated in the figure when relay 25 is not excited, and the opposite positions (hereinafter termed "actuated") upon excitation of relay 25.

In the illustration example, it is assumed that the call-finder CC is associated with a group of one-hundred subscribers. Within such a group, every subscriber number has the same "hundreds" digit, but the "tens" and "units" digits vary among all of these numbers. The switching or transmission means 18, 19 and 20 of the signal distributor generate telegraph signals corresponding, respectively, to "units," "tens," and "hundreds" digits of a calling-subscriber's number. In order to transmit the signal group of the particular calling-subscriber in question, the identification wires leading from switches 18 and 19 are connected to the contact-boards of call-finders.

The transmission means 20, however, is connected to the arm 22 of the call-finder CC because, with the assumed total of one-hundred subscribers, all the subscribers have the same "hundreds" digit. In the figure, the transmission means 18–20 of signal distributor DS are connected to that particular contact-board and that particular call-finder arm which is included in the compensation circuit 17.

Because the transmission means 18–20 are, at one side thereof, multiple-connected to one or to several groups of subscribers, the subscribers' compensation circuits are also multiple-connected. For this reason, in order to prevent return currents from occurring, the multiple circuits are decoupled by rectifiers 31, 32 and 33.

A telegraphic battery 38 is also shown in the drawing. By grounding of a center tapping, battery 38 is arranged to provide two voltages, +TB and −TB, which are equal and opposite with respect to ground.

The operation of the circuit according to the invention will now be described. After a connection has been established, in a well known manner, by the subscriber's device UT, the winding 10 of the telegraph relay 50 is connected in the following closed circuit:

(1) From +TB of battery 38 to selector arm 24, wire 15, receiving magnet 9, contact 8, wire 14, selector arm 23, contact 28 (normal position), the winding 10, contact 27 (normal), resistor 42, and −TB of the battery.

The following compensation circuit for the second telegraph relay winding 11 is simultaneously established:

(2) From +TB to resistor 41, contact 26 (normal), the winding 11, contact 29 (normal), selector arm 22, wire 16, rectifier 35, compensating resistor 36, and ground.

The winding 10 energized by the aforementioned circuit (1) tends to carry the telegraph relay into rest position T of the contact 12, while winding 11 in the circuit (2) tends to establish the signal-transmitting position Z. Because the excitation of winding 10 over circuit (1) is arranged to prevail, contact 12 is set in position T. In order to keep the distortion of forwarded pulses due to the variable electrical characteristics of subscribers' wire pairs within well determined limits, there is provided at the subscribers' terminals AU an element of variable resistance, namely, the compensating resistor 36.

In order to transmit telegraph signal pulses, the subscriber must interrupt the circuit (1) in a certain sequence by means of the transmission contact 8. During every such interruption of circuit (1), the excitation due to circuit (2) of course prevails and carries the contact 12 to position Z. In this manner the telegraph relay 10, 11, 12 forwards the desired telegraph signals along wire 21.

If, now, information suitable to identify the particular calling-subscriber for charge counting is required to be sent to the recording device DR, the following operation takes place. Recorder DR by means of a suitable control output 45 excites relay 25 from the —TB potential. As a result, the contacts 26, 27, 28, 29 all switch to their actuated positions, opposite to those shown in the drawing figure. Contacts 27 and 28 thereupon insert winding 10 in the following circuit:

(3) From —TB of battery 38 to resistor 43, contact 27 (now in its actuated position), the winding 10, contact 28 (actuated), and ground.

The switching of contact 28 over to ground prevents any possibility of the subscriber influencing the state of the telegraph relay, thus avoiding eventual disturbances of the identification processes.

Contacts 26 and 29 now connect wire 16 to the —TB pole of battery 38 through resistor 44, winding 11, and selector arm 22, so that the rectifier 35 blocks the ground potential to which the compensating resistor 36 is connected.

The telegraph relay, previously set to rest position T by means of the prevailing action of circuit (1) over circuit (2), now remains in the same position due to the action of circuit (3). After the excitation of relay 25, signal distributor DS is started by conventional means (not shown). Thereupon the distributor provides, by way of its switching or transmission means 20, for the transmission of the signal sequence corresponding to the "hundreds" digit of the calling-subscriber's number which is to be identified. Upon each closing of switching means 20, winding 11 of the telegraph relay is inserted in the following circuit:

(4) From —TB to resistor 44, contact 29 (actuated), the winding 11, contact 26 (actuated), rectifier 33, transmission means 20, and ground.

Due to the fact that under these conditions the excitation of circuit (4) is caused to prevail over that of circuit (3), the telegraph relay assumes position Z and transmits a telegraph signal corresponding to the received one to recorder DR over wires 21 and 46.

Immediately after the "hundreds" digit has been recorded, a signal train corresponding to the "tens" digit of the calling-subscriber's number is applied to the telegraph relay under control of the centralized signal distributor. Distributor DS now turns on transmission means 19, which places winding 11 in the following circuit:

(5) From —TB to resistor 44, contact 29 (actuated), the winding 11, contact 26 (actuated), selector arm 22, wire 16, rectifier 32, transmission means 19, and ground.

As with the preceding digit, circuit (5) is made to prevail over circuit (3), so that telegraph relay 10, 11, 12 operates to forward signals corresponding to the received "tens" digit signal train to recorder DR over leads 21 and 46. Afterwards, and in the same way, the signal train for the "units" digit is conveyed by transmission means 18, when the distributor DS turns on 18, to the telegraph relay to be forwarded to recorder DR. The recording of the identification number of the particular calling-subscriber is thereupon completed.

After the identification number has thus been recorded, the recording device DR proceeds to de-energize relay 25 over control lead 45. The contacts 26–29 all return to the normal positions of the drawing. Circuits (1) and (2) are thereby restored and the telegraph relay may be operated again by the subscriber with the aid of transmission contact 8.

It is to be understood that although the form of the invention described herein constitutes a preferred embodiment, the invention is not restricted to this particular form and that various changes of the details, operations, and arrangements of parts may be made therein, without departing from the principle and the scope of the invention as defined by the appended claims.

I claim:

1. In an automatic Telex switching exchange comprising:

a subscriber's device, a subscriber's terminal device connected to said subscriber's device, a call-finder connected to said subscriber's terminal device having a first selector arm, a second selector arm, and a third selector arm, a telegraphic relay having a first winding, a second winding, and a transmitting contact actuated by said second winding, said telegraphic relay connected to said call-finder through said selector arms, a telegraphic battery having a positive pole, a negative pole, and a center tap connected to ground, means for connecting said positive pole in series with said first selector arm, said subscriber's terminal device, said second selector arm, said first winding, and said negative pole, a compensation resistor connected to ground located in said subscriber's terminal device, and means for connecting said positive pole in series with said second winding, said third selector arm, and said compensation resistor connected to ground, the improvement comprising a calling-subscriber identification circuit comprising:

a signal distributor having a plurality of outputs adapted to characterize a particular calling subscriber, means for connecting said outputs to ground, means for connecting said outputs through rectifier means to said second winding, a recording device having a first terminal connected in series with a relay switching means and said negative terminal, said recording device having a second terminal adapted to be connected in series with said transmitting contact and said negative terminal, said relay switching means, during progress of a subscriber identification, disconnecting said first winding from said first selector arm and said second selector arm, connecting said first winding in series with said negative terminal and ground, disconnecting said second winding from said positive pole and connecting in series said negative pole, said second winding and said outputs whereby an identification signal is transmitted from said signal distributor to said recording device, and rectifier means connected in series with said compensation resistor whereby ground potential is blocked during identification.

2. In an automatic Telex switching exchange, wherein call-finders are provided with two arms for connecting a first winding of a telegraph relay in a writing telegraph circuit during a call through two corresponding board blades, comprising a calling subscriber's device and a subscriber's terminal device having a third arm for connecting, through a corresponding board blade, a second winding of the said telegraph relay to a compensation resistor located in the subscriber's terminal device and thereat connected to ground, a telegraphic battery is provided as a power source, said telegraphic battery having a positive and a negative pole and having a center tap connected to ground; a circuit arrangement for calling-subscriber identification provided with a signal distributor having a plurality of outputs adapted to characterize a particular calling subscriber, each output being connected through rectifier means to the board blades of the said third arm of the call-finder and having means for connecting each of said outputs sequentially to ground; a recording device connected with the transmitting contact of the said relay and driven during progress of a subscriber identification switching means for disconnecting the first winding of said relay from the said writing telegraph circuit and for connecting said first winding in a local circuit between ground and negative pole of said battery and for disconnecting said second winding from the positive pole of said battery so that said transmitting contact of the telegraph relay is carried into signal-transmitting position by ground pulses transmitted by said signal distributor for retransmitting the identification signal to the recording device; and rectifier means connected with said compensation resistor to block, during progress of a subscriber identification, the ground potential to which the compensation resistor is connected.

References Cited by the Examiner

UNITED STATES PATENTS

| | | | |
|---|---|---|---|
| 2,147,249 | 2/1939 | Franklin | 178—4.3 |
| 2,282,564 | 5/1942 | Crocker | 179—27.12 |

NEIL C. READ, *Primary Examiner.*

ROBERT H. ROSE, *Examiner.*

A. J. DUNN, T. A. ROBINSON, *Assistant Examiners.*